April 14, 1936.     N. SCANDORE     2,037,341
BOX
Filed Aug. 27, 1935
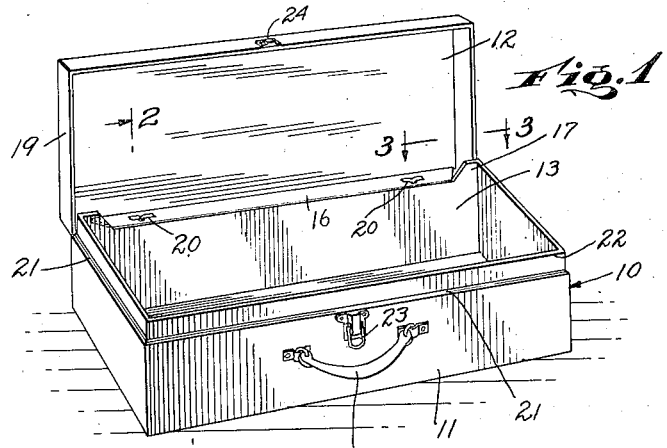
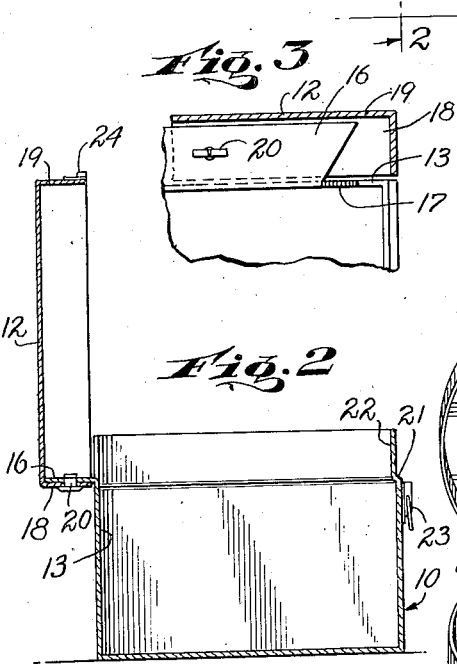
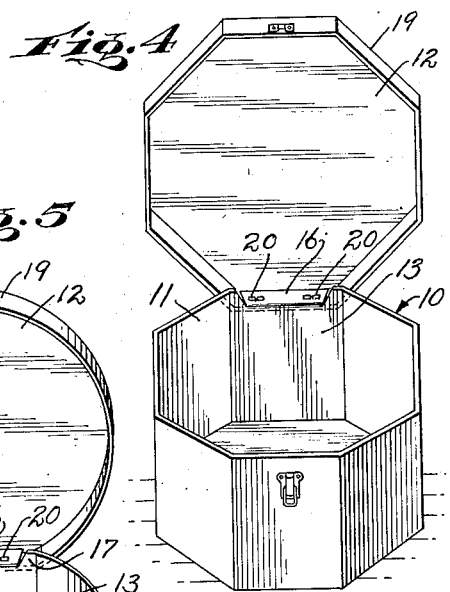
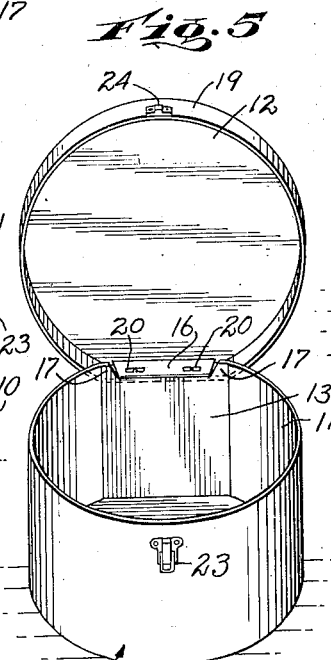
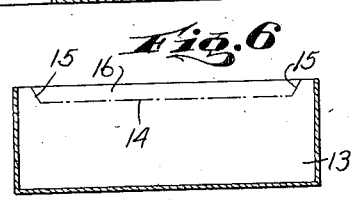
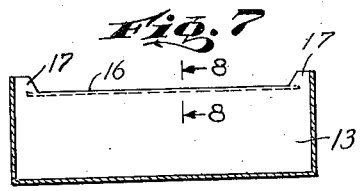
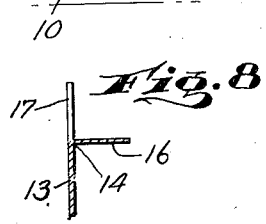
INVENTOR
Nicholas Scandore
BY
ATTORNEY

Patented Apr. 14, 1936

2,037,341

UNITED STATES PATENT OFFICE 2,037,341

BOX

Nicholas Scandore, Brooklyn, N. Y.

Application August 27, 1935, Serial No. 38,019

1 Claim. (Cl. 229—44)

The present invention deals with the art of making boxes and more particularly is directed to an improved box characterized by a simplified hinged connection between the body of the box and its cover.

The invention has as a primary object the provision of a box comprising a closed bottom enclosure having a novel hinged connection for bodily carrying the cover of the box, the hinged connection embodying a swingable longitudinally disposed flange struck out from a wall of the enclosure and appropriately fastened to a corresponding wall of the cover.

The invention has as a further object the provision of box comprising a cover having an upper marginal portion thereof integrally offset to define a peripheral shoulder limiting downward displacement of a swingable cover connected to the enclosure of the box.

The invention contemplates as a further object the provision of a simplified box construction having an enclosure including an integrally offset marginal neck portion defining a vertical guide and a horizontal peripheral seat for a depending rim of an associated swingable cover, the depending rim of the latter in the closed position thereof having its vertical surfaces flush with corresponding vertical walls of the enclosure.

The invention has as another object the provision of a relatively rugged box construction which comprises comparatively few parts, which can be readily assembled and which may be produced at a relatively low cost.

Other objects, advantages and features of the invention are in part obvious and in part hereinafter specifically pointed out.

The invention accordingly comprises, features of construction, combination of elements, and arrangement of parts exemplified in the construction herein especially set forth in detail and the scope thereof will be more particularly pointed out in the appended claims.

For a clearer understanding of the invention and how all of the features, advantages and objects thereof are accomplished and carried into effect, attention is directed to the embodiments shown in the accompanying drawing in which:—

Fig. 1 is a perspective view of a simplified box according to my invention.

Fig. 2 is a transverse sectional view of Fig. 1.

Fig. 3 is a sectional view on the line 3—3 of Fig. 1.

Fig. 4 is a front elevational view of a modified form of box including the improvement according to the invention.

Fig. 5 illustrates an elevational view of another form of the invention.

Fig. 6 is a longitudinal elevational view of the rear wall of the box illustrated in Fig. 1, particularly showing the upper central marginal part thereof kerfed and scored to define an integrally hinged flange.

Fig. 7 is a view similar to Fig. 6 showing the integral hinged flange swung rearwardly relative to the rear wall.

Fig. 8 is an enlarged showing on the line 8—8 of Fig. 7 and

Fig. 9 illustrates a further simplified box construction embodying the improvements to the invention.

Hitherto, in the art of manufacturing boxes, and particularly the cardboard type comprising the conventional closed bottom enclosure and companion swingable cover, the hinged connection between both of the latter was customarily formed by a piece of muslin or cloth appropriately secured thereto or it was the common practice to form the hinge connection by a swingable flap depending from the cover and anchoring the flap between an independent rim within the enclosure and an adjacent wall of the latter, the rim being well known in the art as a "neck" usually formed as a separate entity. In either of the above methods, additional cardboard material was necessary, for example, extra cardboard was required to make the depending swingable flap, the so called "neck"; or muslin or the like together with suitable adhesive for connecting the latter to the enclosure and cover were utilized. The present invention is realized by providing a hinged and simplified connection without resorting to the use of a swingable depending flap from the cover, the use of an independent neck, or to the use of muslin and adhesive. By the herein disclosed method, the box construction formed has added simplicity without decreasing its efficiency and it has a further aspect in that no extra cardboard material is required since the hinged connection for the cover and enclosure is characterized by utilizing a part of the enclosure to which the cover is appropriately anchored.

Illustrative of the forms according to the invention, the several types of boxes shown in the drawing each is generally designated 10 and each comprise a closed bottom cardboard enclosure 11 adapted to swingably carry its companion cover 12. In the forms illustrated in Figs. 1 and 9, the box is of the rectangular cardboard type and is adaptable for many uses, namely, for storing toys, dolls, hats, shoes, and other varieties of merchandise. The form illustrated in Fig. 4 is of the octagonal type. According to the type illustrated in Fig. 5 the box has a substantially cylindrical contour. However, irrespective of the type of construction desired, each of the boxes according to the invention comprise a rear wall 13 having its upper marginal portion creased along a horizontal fulcrum line 14 and provided with spaced biased or inclined kerfs or cuts 15 sloping downwardly and inwardly.

Accordingly a trapezoidal shaped flange 16 is formed. This flange is swung rearwardly along the line 14, thereby an integral hinge connection is developed with its rear wall of the enclosure, and the spaced trapezoidal shoulders 17 remaining at the upper marginal part of the rear wall processed in accordance with the invention prevent weakening of the adjacent corners of the enclosure.

Having formed the integral hinge on the rear wall, the swingable flange 16 is placed longitudinally against the inside face of the wall 18 of an integrally depending peripheral rim 19. Subsequently suitable rivets or clasps 20 are extended through both flange 16 and wall 18, thus fixedly anchoring the latter together. Hence it is apparent that cover 12 of all of the forms disclosed is bodily movable with a companion flange 16 which is integrally hinged to the enclosure.

In the form according to Fig. 1, the front and side walls of the enclosure 11 each have their upper marginal portions integrally offset to define a peripheral shoulder or ledge 21 forming a seat for the peripheral lower edge of the cover. Above seat 21 and integral therewith is the reduced neck 22 forming a vertical guide to conduct downward displacement of the cover relative to the enclosure. With the cover closed, that is, resting on seat 21, the outside faces of the enclosure are flush with corresponding outer faces of cover.

The box according to Fig. 9 is provided with the hinged connection of the type disclosed in Fig. 1 but without an integral offset upper reduced neck portion. However, in Fig. 9, the upper peripheral edge of the enclosure serves to limit downward displacement of the cover.

The box illustrated in Fig. 4 is noncircular in form and includes the hinged connection disclosed in connection with Figs. 1 and 9.

In Fig. 5, a substantially cylindrical box is illustrated, rear wall 13 thereof, however is rectilinear and embodies the hinged connection of the type shown in Figs. 1, 4 and 9.

If desired, the enclosure and cooperating cover therefore of the several embodiments specifically referred may be provided with complementary disconnectible locking members 23 and 24 and an appropriate handle permitting the box to be conveniently carried about from place to place.

While the principle of this invention has been shown and described in connection with specific embodiments thereof, the features of which have also been described in detail, it is to be understood that this has been done merely for purposes of disclosure, and that the words of description employed in the claim are to be considered as illustrative and not as words of limitation.

I claim:—

A box comprising an enclosure having an integrally connected inwardly offset upper marginal portion to define a seat, and having spaced biased kerfs and a fulcrum line interconnecting said kerfs, the portion of said enclosure between said kerfs and line being integral with the body of said enclosure to constitute a transversely swingable longitudinally disposed flange, spaced downwardly and inwardly inclined shoulders defined by said kerfs constituting means to prevent weakening of spaced corner portions of said enclosure adjacent said shoulders, and a cover secured to said flange and bodily movable therewith, said marginal portion constituting means to guide displacement of said cover relative to said enclosure, and said seat defining means to limit downward displacement of said cover.

NICHOLAS SCANDORE.